United States Patent
Vig et al.

(10) Patent No.: US 11,860,835 B1
(45) Date of Patent: Jan. 2, 2024

(54) EFFICIENT DROP COLUMN REQUESTS IN A NON-RELATIONAL DATA STORE

(71) Applicant: Amazon Technologies, Inc., Seattle, WA (US)

(72) Inventors: Akshat Vig, Seattle, WA (US); Almero Gouws, Bainbridge Island, WA (US); Steven A Mayszak, Seattle, WA (US); Olaf Anders Grette, Issaquah, WA (US); Arturo Hinojosa, Redwood City, CA (US); Lakshmi Narasimha Guptha Munuhur Rajagopal, Shoreline, WA (US); Nicholas Gordon, Seattle, WA (US); Somasundaram Perianayagam, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 51 days.

(21) Appl. No.: 16/915,879

(22) Filed: Jun. 29, 2020

(51) Int. Cl.
*G06F 16/215* (2019.01)
*G06F 16/22* (2019.01)
*G06F 16/23* (2019.01)

(52) U.S. Cl.
CPC .......... *G06F 16/215* (2019.01); *G06F 16/221* (2019.01); *G06F 16/2365* (2019.01)

(58) Field of Classification Search
CPC ... G06F 16/215; G06F 16/221; G06F 16/2365
See application file for complete search history.

(56) References Cited

U.S. PATENT DOCUMENTS

| | | | |
|---|---|---|---|
| 8,583,692 B2 | 11/2013 | Ganesh et al. | |
| 8,655,900 B2 | 2/2014 | Cosic | |
| 10,909,091 B1* | 2/2021 | Shah | G06F 16/2379 |
| 2006/0047658 A1* | 3/2006 | Baird | G06F 21/62 |
| 2007/0130171 A1* | 6/2007 | Hanckel | G06F 16/2477 |
| 2007/0143353 A1* | 6/2007 | Chen | G06F 12/0292 |
| 2008/0115015 A1* | 5/2008 | Ikezawa | G06F 3/0619 |
| | | | 714/E11.178 |
| 2012/0084524 A1* | 4/2012 | Gokhale | G06F 16/24544 |
| | | | 711/E12.103 |
| 2016/0042046 A1* | 2/2016 | Whitehead | G06F 16/282 |
| | | | 707/640 |
| 2018/0096013 A1* | 4/2018 | Warshavsky | G06F 16/2282 |
| 2018/0150490 A1* | 5/2018 | Lipcon | G06F 16/2282 |
| 2018/0246807 A1* | 8/2018 | Andrei | G06F 16/901 |

\* cited by examiner

*Primary Examiner* — Taelor Kim
(74) *Attorney, Agent, or Firm* — S. Scott Foster; Kowert, Hood, Munyon, Rankin & Goetzel, P.C.

(57) ABSTRACT

Columns of a non-relational data store may be efficiently dropped. A drop column request for a table stored in a non-relational database may be received. In response to the drop column request, schema information for the table may be updated to filter out the column from subsequent read responses to read requests. A backup of the table is created and evaluated to identify those items in the table that include the column. The column is then deleted from the identified items.

20 Claims, 9 Drawing Sheets

EFFICIENT DROP COLUMN REQUESTS IN A NON-RELATIONAL DATA STORE

BACKGROUND

Database systems manage large amounts of data on behalf of client applications. To support various client application features, different types of data management requests, including requests to create, update, read, or delete data may be supported. As some database systems may support different formats for stored data, techniques to support create, update, read, or delete data may be adapted to manage data in different formats.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The techniques described herein may implement efficient drop column requests in a non-relational database, according to some embodiments. Because the size of data stored in a non-relational database table can grow large, operations that can quickly reduce the amount of data stored can decrease storage utilization and improve non-relational database performance for client applications. In some embodiments, a "drop column" request may be implemented, which can remove the same attributes from items in table of a table, as if those attributes were stored in a some column in a relational database table even though the attributes may not be stored in such a fashion (or may not be present at all for some items) in a non-relational database table. Instead of scanning a table to identify which items to remove for performing a drop column request in a non-relational database, efficient techniques may be implemented, in various embodiments as discussed below, saving computational resources and storage resources for client or system using, which in turn improves the performance of the non-relational database system overall.

Figure 1:
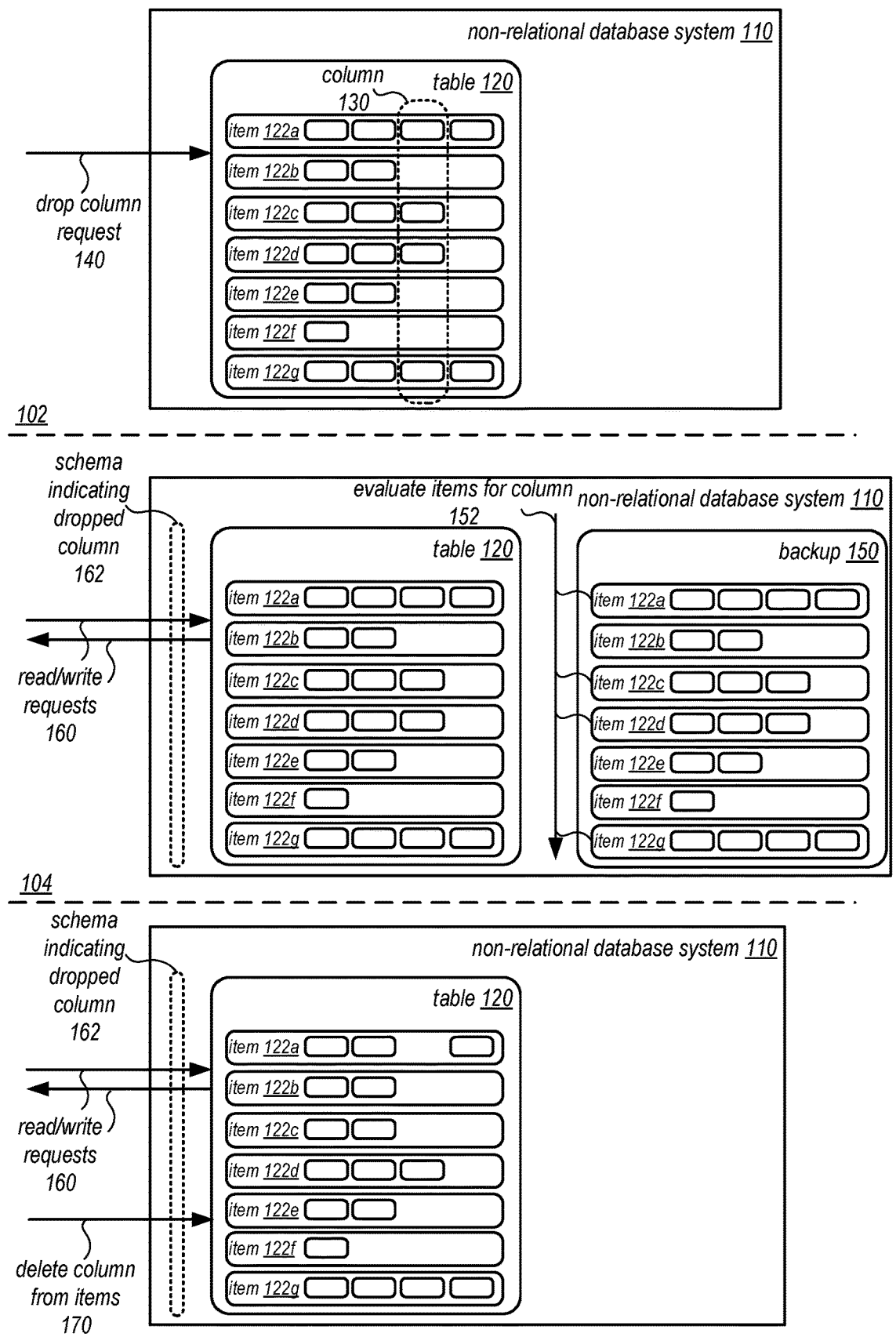
FIG. 1 is a logical block diagram illustrating efficient drop column requests in a non-relational database, according to some embodiments.

FIG. 1 is a logical block diagram illustrating efficient drop column requests in a non-relational database, according to some embodiments. A non-relational database system 110 may store a table, such as table 120 on behalf of one or more clients. Table 120 may be a collection of items, such as items 122*a*, 122*b*, 122*c*, 122*d*, 122*e*, 122*f*, 122*g*, and so on. Items in a table in a non-relational database 100 may not be required to adhere to a strict schema that requires, for instance, values for every column in a table (even if that value is a NULL value), in some embodiments. Nor, in some embodiments, may a non-relational database system 110 require a particular ordering for storing items (e.g., on disk), such that each item with a same attribute may have the attribute stored in the same order for that item. Instead an item 122 and a table 120 may be different groupings of attributes (e.g., a table is a group of items where each item may be a group of one or more attributes). In some embodiments, a column may be items that have a same named attribute (e.g., a "postal code" attribute). For example, as illustrated in scene 102, table 120 has column 130 which is not present in every item (e.g., not in 122*b*, 122*e* and 122*f*). As the non-relational database system 110 may not have the column present in every item, a column's values can be costly to locate as a scan of each item may have to be performed, in some embodiments.

For operations like drop column request 140, which would need to access each item with the column, efficient drop column techniques may be implemented to improve performance of the drop column without sacrificing performance of other requests. For example, drop column request 140 may target column 130. As illustrated in scene 104, a backup 150 of table 120 may be created. Instead of evaluating the table directly, which may interfere with other read/write requests 160, an evaluation of backup 150 can look for those items with the column 130 to be dropped (e.g., 122*a*, 122*c*, 122*d*, 122*g*). For handling read/write requests 160, a schema indicating the dropped column 162 may be enforced, as discussed in detail below with regard to FIGS. 5, 7, and 8.

As indicated at scene 106, operations 170 to delete the column from identified items may be performed while continuing to handle read/write requests. As discussed below with regard to FIGS. 4A and 4B, different techniques for allocating or ordering delete operations to limit or remove interference with read/write requests 160 can be implemented. Moreover, as the operations to delete the column from items are specific to those items in which the column attribute is present, unnecessary operations to access items without the column attribute are not performed, in some embodiments.

Please note that previous descriptions of a non-relational database, table, and backup are not intended to be limiting, but are merely provided as logical examples. Various other types of non-relational database systems, collections of items, or other types of database systems that do not implement strict column requirements, for example, may implement efficient drop column techniques.

This specification begins with a general description of a provider network that may implement a non-relational database service that may implement efficient drop column requests in a non-relational database. Then various examples of a non-relational database service are discussed, including different components/modules, or arrangements of components/module, that may be employed as part of implementing the non-relational database service, in some embodiments. A number of different methods and techniques to implement efficient drop column requests in a non-relational database are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
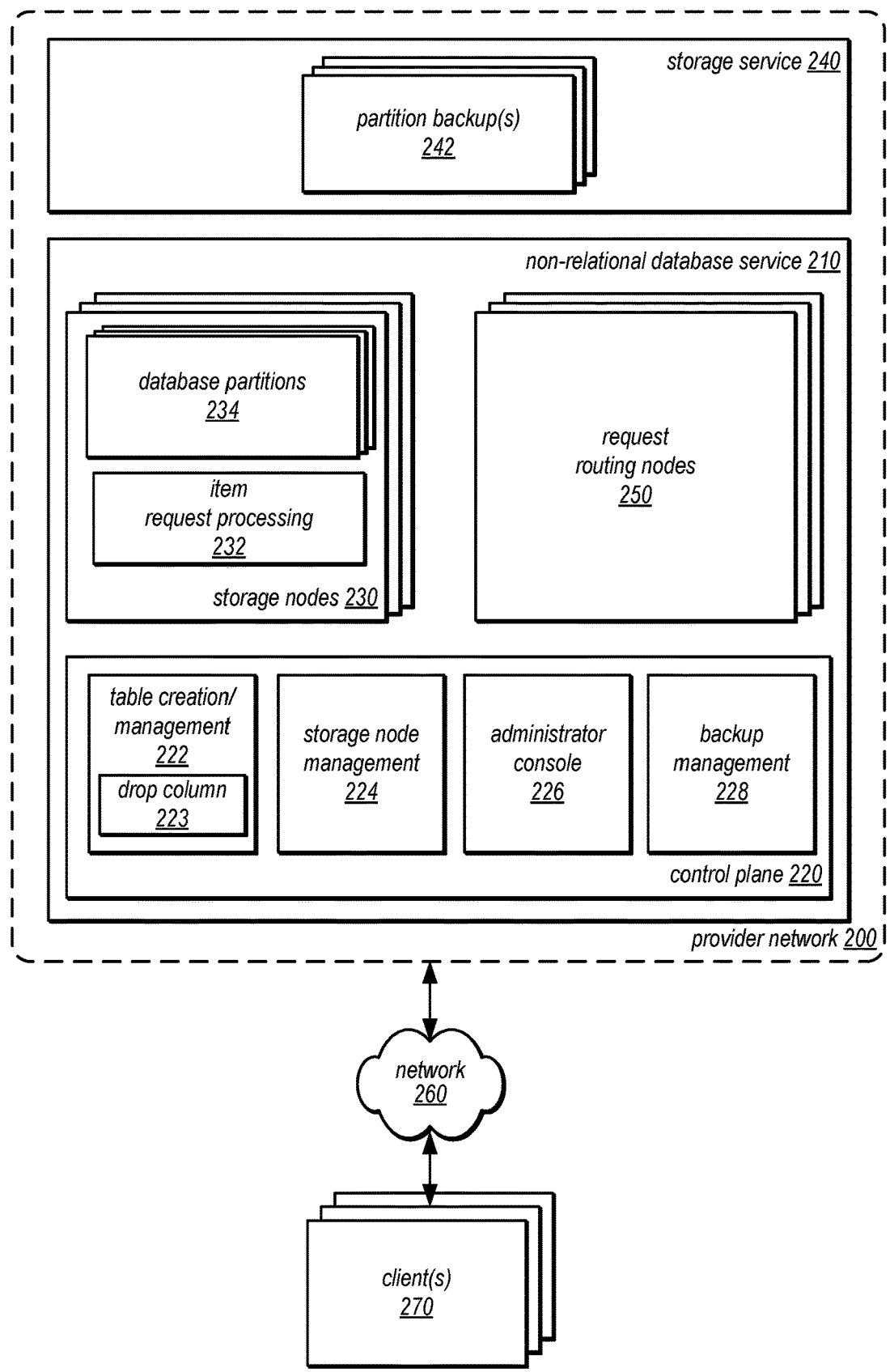
FIG. 2 is a logical block diagram illustrating a provider network offering a database service that may implement efficient drop column requests in a non-relational database, according to some embodiments.

FIG. 2 is a logical block diagram illustrating a provider network offering a database service that may implement different types of index structures for storing database data in a replica group, according to some embodiments. Provider network 200 may be a private or closed system, in some embodiments, or may be set up by an entity such as a company or a public sector organization to provide one or more services (such as various types of cloud-based storage) accessible via the Internet and/or other networks to clients 270, in another embodiment. In some embodiments, provider network 200 may be implemented in a single location or may include numerous data centers hosting various resource pools, such as collections of physical and/or virtualized computer servers, storage devices, networking equipment and the like (e.g., computing system 1000 described below with regard to FIG. 9), needed to implement and distribute the infrastructure and storage services offered by the provider network 200. In some embodiments, provider network 200 may implement various computing resources or services, such as non-relational database service 210 (e.g., a NoSQL database, key-value or other non-relational database service that may utilize collections of items (e.g., tables that include items)), storage services 240 (e.g., an object storage service, block-based storage service, or data storage service that may store different types of data for centralized access), and other services (not illustrated), such as data flow processing service, and/or other large scale data processing techniques), virtual compute services, and/or any other type of network-based services (which may include various other types of storage, processing, analysis, communication, event handling, visualization, and security services).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), in some embodiments, each of which may be similar to the computer system embodiment illustrated in FIG. 9 and described below. In some embodiments, the functionality of a given system or service component (e.g., a component of key value non-relational database service 210) may be implemented by a particular node or may be distributed across several nodes. In some embodiments, a given node may implement the functionality of more than one service system component (e.g., more than one data store component).

Non-relational database service 210 may be implemented various types of distributed database services, in some embodiments, for storing, accessing, and updating data in tables hosted in key-value database. Such services may be enterprise-class database systems that are highly scalable and extensible. In some embodiments, access requests (e.g., requests to get/obtain items, put/insert items, delete items, update or modify items, scan multiple items) may be directed to a table in non-relational database service 210 that is distributed across multiple physical resources, and the database system may be scaled up or down on an as needed basis. In some embodiments, clients/subscribers may submit requests in a number of ways, e.g., interactively via graphical user interface (e.g., a console) or a programmatic interface to the database system. In some embodiments, non-relational database service 210 may provide a RESTful programmatic interface in order to submit access requests (e.g., to get, insert, delete, or scan data).

In some embodiments, clients 270 may encompass any type of client configurable to submit network-based requests to provider network 200 via network 260, including requests for non-relational database service 210 (e.g., to access item(s) in a table in non-relational database service 210). For example, in some embodiments a given client 270 may include a suitable version of a web browser, or may include a plug-in module or other type of code module that executes as an extension to or within an execution environment provided by a web browser. Alternatively in a different embodiment, a client 270 may encompass an application such as a database client/application (or user interface thereof), a media application, an office application or any other application that may make use of a database in non-relational database service 210 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 270 may be an application that interacts directly with provider network 200, in some embodiments. In some embodiments, client 270 may generate network-based services requests according to a Representational State Transfer (REST)-style network-based services architecture, a document- or message-based network-based services architecture, or another suitable network-based services architecture. Note that in some embodiments, clients of non-relational database service 210 may be implemented within provider network 200 (e.g., applications hosted on a virtual compute service).

In some embodiments, clients of non-relational database service 210 may be implemented on resources within provider network 200 (not illustrated). For example, a client application may be hosted on a virtual machine or other computing resources implemented as part of another provider network service that may send access requests to non-relational database service 210 via an internal network (not illustrated).

In some embodiments, a client 270 may provide access to provider network 200 to other applications in a manner that is transparent to those applications. For example, client 270 may integrate with a database on non-relational database service 210. In such an embodiment, applications may not need to be modified to make use of a service model that utilizes non-relational database service 210. Instead, the details of interfacing to the non-relational database service 210 may be coordinated by client 270.

Client(s) 270 may convey network-based services requests to and receive responses from provider network 200 via network 260, in some embodiments. In some embodiments, network 260 may encompass any suitable combination of networking hardware and protocols necessary to establish network-based-based communications between clients 270 and provider network 200. For example, network 260 may encompass the various telecommunications networks and service providers that collectively implement the Internet. In some embodiments, network 260 may also include private networks such as local area networks (LANs) or wide area networks (WANs) as well as public or private wireless networks. For example, both a given client 270 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client(s) 270 and the Internet as well as between the Internet and provider network 200. It is noted that in some embodiments, client(s) 270 may communicate with provider network 200 using a private network rather than the public Internet.

Database service 210 may implement request routing nodes 250, in some embodiments. Request routing nodes 250 may receive and parse access requests, in various embodiments in order to determine various features of the request, to parse, authenticate, throttle and/or dispatch access requests, among other things, in some embodiments.

In some embodiments, non-relational database service 210 may implement control plane 220 to implement one or more administrative components, such as automated admin instances which may provide a variety of visibility and/or control functions). In various embodiments, control plane 220 may direct the performance of different types of control plane operations among the nodes, systems, or devices implementing non-relational database service 210, in some embodiments. Control plane 220 may provide visibility and control to system administrators via administrator console 226, in some embodiment. Admin console 226 may allow system administrators to interact directly with non-relational database service 210 (and/or the underlying system). In some embodiments, the admin console 226 may be the primary point of visibility and control for non-relational database service 210 (e.g., for configuration or reconfiguration by system administrators). For example, the admin console may be implemented as a relatively thin client that provides display and control functionally to system administrators and/or other privileged users, and through which system status indicators, metadata, and/or operating parameters may be observed and/or updated. Control plane 220 may provide an interface or access to information stored about one or more detected control plane events, such as data backup or other management operations for a table, at non-relational database service 210, in some embodiments.

Storage node management 224 may provide resource allocation, in some embodiments, for storing additional data in table submitted to database key-value service 210. For instance, control plane 220 may communicate with processing nodes to initiate the performance of various control plane operations, such as moves of multi-table partitions, splits of multi-table partitions, update tables, delete tables, and create indexes, among others. In some embodiments, control plane 220 may include a node recovery feature or component that handles failure events for storage nodes 230, and request routing nodes 250 (e.g., adding new nodes, removing failing or underperforming nodes, deactivating or decommissioning underutilized nodes, etc).

Various durability, resiliency, control, or other operations may be directed by control plane 220. For example, storage node management 224 may detect split, copy, or move events for multi-table partitions at storage nodes in order to ensure that the storage nodes maintain satisfy a minimum performance level for performing access requests. For instance, in various embodiments, there may be situations in which a partition (or a replica thereof) may need to be copied, e.g., from one storage node to another. For example, if there are three replicas of a particular partition, each hosted on a different physical or logical machine, and one of the machines fails, the replica hosted on that machine may need to be replaced by a new copy of the partition on another machine. In another example, if a particular machine that hosts multiple partitions of one or more tables experiences heavy traffic, one of the heavily accessed partitions may be moved (using a copy operation) to a machine that is experiencing less traffic in an attempt to more evenly distribute the system workload and improve performance. In some embodiments, storage node management 224 may perform partition moves using a physical copying mechanism (e.g., a physical file system mechanism, such as a file copy mechanism) that copies an entire partition from one machine to another, rather than copying a snapshot of the partition data row by. While the partition is being copied, write operations targeting the partition may be logged. During the copy operation, any logged write operations may be applied to the partition by a catch-up process at periodic intervals (e.g., at a series of checkpoints). Once the entire partition has been copied to the destination machine, any remaining logged write operations (i.e. any write operations performed since the last checkpoint) may be performed on the destination partition by a final catch-up process. Therefore, the data in the destination partition may be consistent following the completion of the partition move, in some embodiments. In this way, storage node management 224 can move partitions amongst storage nodes 230 while the partitions being moved are still "live" and able to accept access requests.

In some embodiments, the partition moving process described above may be employed in partition splitting operations by storage node management 224 in response to the detection of a partition split event. For example, a partition may be split because it is large, e.g., when it becomes too big to fit on one machine or storage device and/or in order to keep the partition size small enough to quickly rebuild the partitions hosted on a single machine (using a large number of parallel processes) in the event of a machine failure. A partition may also be split when it becomes too "hot" (i.e. when it experiences a much greater than average amount of traffic as compared to other partitions). For example, if the workload changes suddenly and/or dramatically for a given partition, the system may be configured to react quickly to the change. In some embodiments, the partition splitting process described herein may be transparent to applications and clients/users, which may allow the data storage service to be scaled automatically (i.e. without requiring client/user intervention or initiation).

In some embodiments, each database partition 234 may be identified by a partition ID, which may be a unique number (e.g., a GUID) assigned at the time the partition is created. A partition 234 may also have a version number that is incremented each time the partition goes through a reconfiguration (e.g., in response to adding or removing replicas, but not necessarily in response to a master failover). When a partition is split, two new partitions may be created, each of which may have a respective new partition ID, and the original partition ID may no longer be used, in some embodiments. In some embodiments, a partition may be split by the system using a split tool or process in response to changing conditions.

Split or move events may be detected by storage node management 224 in various ways. For example, partition size and heat, where heat may be tracked by internally measured metrics (such as IOPS), externally measured metrics (such as latency), and/or other factors may be evaluated with respect to various performance thresholds.

System anomalies may also trigger split or move events (e.g., network partitions that disrupt communications between replicas of a partition in a replica group, in some embodiments. Storage node management 224 may detect storage node failures, or provide other anomaly control, in some embodiments. If the partition replica hosted on the storage node on which a fault or failure was detected was the master for its replica group, a new master may be elected for the replica group (e.g., from amongst remaining storage nodes in the replica group). Storage node management 224 may initiate creation of a replacement partition replica while the source partition replica is live (i.e. while one or more of the replicas of the partition continue to accept and service requests directed to the partition), in some embodiments. In various embodiments, the partition replica on the faulty storage node may be used as the source partition replica, or another replica for same partition (on a working machine) may be used as the source partition replica, e.g., depending type and/or severity of the detected fault.

Control plane 220 may implement table creation and management 222 to manage the creation (or deletion) of database tables hosed in non-relational database service 210, in some embodiments. For example, a request to create a table may be submitted via administrator console 226 which may initiate performance of a workflow to generate appropriate system metadata (e.g., a table identifier that is unique with respect to all other tables in non-relational database service 210, table performance or configuration parameters, etc.). Because tables may be stored in multi-table partitions, resource allocation for a table to be created may be avoided as multi-partition tables may be updated to handle additional data according to storage node management 224, or other partition management features, in some embodiments. Table creation/management 222 may also implement features to handle a drop column, as indicated at 223, and discussed below with regard to FIG. 3. Backup management 228 may handle the creation of backup requests to make copies as of a version or point-in-time of a database, as backup partitions 242 in storage service 240.

In some embodiments, non-relational database service 210 may also implement a plurality of storage nodes 230, each of which may manage one or more partitions of a database table on behalf of clients/users or on behalf of non-relational database service 210 which may be stored in database storage 234 (on storage devices attached to storage nodes 230 or in network storage accessible to storage nodes 230).

Storage nodes 230 may implement item request processing 232, in some embodiments. Item request processing 232 may perform various operations (e.g., read/get, write/update/modify/change, insert/add, or delete/remove) to access individual items stored in tables in non-relational database service 210, in some embodiments. In some embodiments, item request processing 232 may support operations performed as part of a transaction, including techniques such as locking items in a transaction and/or ordering requests to operate on an item as part of transaction along with other requests according to timestamps (e.g., timestamp ordering) so that storage nodes 230 can accept or reject the transaction-related requests. In some embodiments, item request processing 232 may maintain database partitions 234 according to a database model (e.g., a non-relational, NoSQL, or other key-value database model). Item request processing may include processing for sub-tables, as discussed below with regard to FIG. 4.

In addition to dividing or otherwise distributing data (e.g., database tables) across storage nodes 230 in separate partitions, storage nodes 230 may also be used in multiple different arrangements for providing resiliency and/or durability of data as part of larger collections or groups of resources. A replica group, for example, may be composed of a number of storage nodes maintaining a replica of particular portion of data (e.g., a partition) for the non-relational database service 210. Moreover, different replica groups may utilize overlapping nodes, where a storage node 230 may be a member of multiple replica groups, maintaining replicas for each of those groups whose other storage node 230 members differ from the other replica groups.

Different models, schemas or formats for storing data for database tables in non-relational database service 210 may be implemented, in some embodiments. For example, in some embodiments, non-relational, NoSQL, semi-structured, or other key-value data formats may be implemented. In at least some embodiments, the data model may include tables containing items that have one or more attributes. In such embodiments, each table maintained on behalf of a client/user may include one or more items, and each item may include a collection of one or more attributes. The attributes of an item may be a collection of one or more name-value pairs, in any order, in some embodiments. In some embodiments, each attribute in an item may have a name, a type, and a value. In some embodiments, the items may be managed by assigning each item a primary key value (which may include one or more attribute values), and this primary key value may also be used to uniquely identify the item. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s). In other words, the tables maintained by the non-relational database service 210 (and the underlying storage system) may have no pre-defined schema other than their reliance on the primary key.

Metadata or other system data for tables may also be stored as part of database partitions using similar partitioning schemes and using similar indexes, in some embodiments.

Database service 210 may provide an application programming interface (API) for requesting various operations targeting tables, indexes, items, and/or attributes maintained on behalf of storage service clients. In some embodiments, the service (and/or the underlying system) may provide both control plane APIs and data plane APIs. The control plane APIs provided by non-relational database service 210 (and/or the underlying system) may be used to manipulate table-level entities, such as tables and indexes and/or to re-configure various tables These APIs may be called relatively infrequently (when compared to data plane APIs). In some embodiments, the control plane APIs provided by the service may be used to create tables or secondary indexes for tables at separate storage nodes, import tables, export tables, delete tables or secondary indexes, explore tables or secondary indexes (e.g., to generate various performance reports or skew reports), modify table configurations or operating parameter for tables or secondary indexes, and/or describe tables or secondary indexes. In some embodiments, control plane APIs that perform updates to table-level entries may invoke asynchronous workflows to perform a requested operation. Methods that request "description" information (e.g., via a describeTables API) may simply return the current known state of the tables or secondary indexes maintained by the service on behalf of a client/user. The data plane APIs provided by non-relational database service 210 (and/or the underlying system) may be used to perform item-level operations, such as requests for individual items or for multiple items in one or more tables table, such as queries, batch operations, and/or scans.

The APIs provided by the service described herein may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

Database service 210 may include support for some or all of the following operations on data maintained in a table (or index) by the service on behalf of a storage service client: delete (or drop) a column (as discussed above with regard to FIG. 1 and below with regard to FIGS. 3-8), perform a transaction (inclusive of one or more operations on one or more items in one or more tables), put (or store) an item, get (or retrieve) one or more items having a specified primary key, delete an item, update the attributes in a single item, query for items using an index, and scan (e.g., list items) over the whole table, optionally filtering the items returned, or conditional variations on the operations described above that are atomically performed (e.g., conditional put, conditional get, conditional delete, conditional update, etc.). For example, the non-relational database service 210 (and/or underlying system) described herein may provide various data plane APIs for performing item-level operations, such as a TransactItems API, PutItem API, a GetItem (or GetItems) API, a DeleteItem API, and/or an UpdateItem API, as well as one or more index-based seek/traversal operations across multiple items in a table, such as a Query API and/or a Scan API.

Storage service 240 may be file, object-based, or other type of storage service that may be used to store backups 242 for evaluating to delete a column as discussed below with regard to FIGS. 3-6. Storage service 240 may implement striping, sharding, or other data distribution techniques so that different portions of a partition backup 242 are stored across multiple locations (e.g., at separate nodes).

Figure 3:
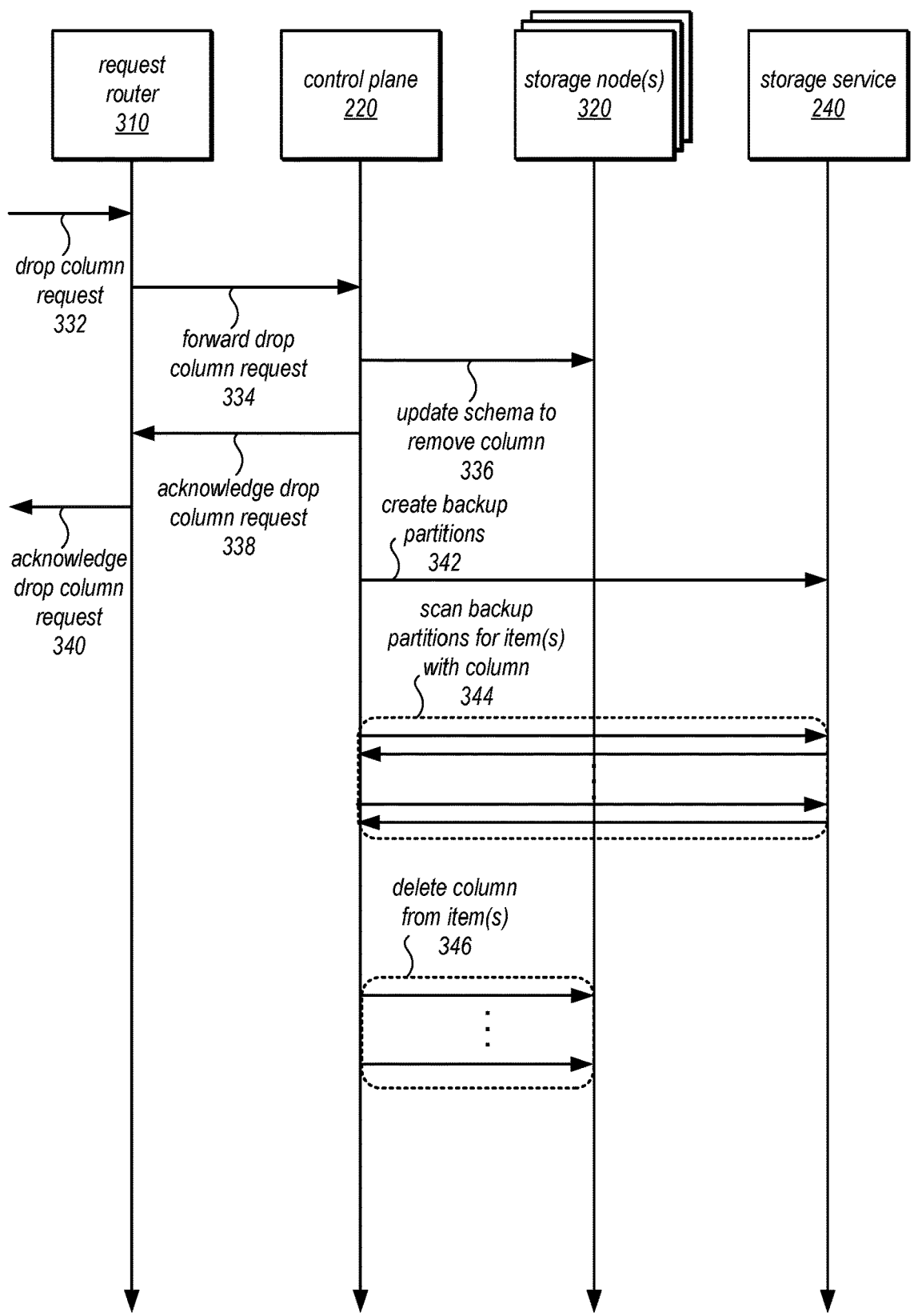
FIG. 3 is a sequence diagram illustrating dropping a column in a database service, according to some embodiments.

FIG. 3 is a sequence diagram illustrating dropping a column in a database service, according to some embodiments. Request router 310 may receive drop column request 332. Request router 310 may forward drop column request 334 to control plane 220. Control plane 220 may update the schema to remove the column, as indicated at 336, from storage node(s) 320. In this way, storage node(s) 320 may no longer accept requests directed to the dropped column attribute and may instead return an error response (e.g., item not present). In other embodiments, schema information may be stored in another location. In such embodiments, a similar request or instruction may be sent (e.g. similar to 336) to the other location. Control plane 220 may acknowledge the drop column request, as indicated at 338. Request router 310 may then acknowledge the drop column request to the client, as indicated at 340. In some embodiments, a limited number of drop column requests may be permitted. Therefore, a table may be locked against subsequent drop column requests if the permitted number is exceeded (e.g., only 1 drop column request at a time). If a table is locked against drop column requests, then a denial or other error response may be returned for the drop column request.

Control plane 220 may then create backup partitions 342 of the table to be stored in storage service 240. Control plane 220 may then scan the backup partitions for item(s) with the column, as indicated at 344. A list of items to be updated may be determined and then used to send delete column requests from items, as indicated at 346 to storage nodes 320. Note, in some embodiments (not illustrated) request router 310 may perform the scan of backup partitions, as indicated at 344 and/or the deletion column from items.

Figure 4A:
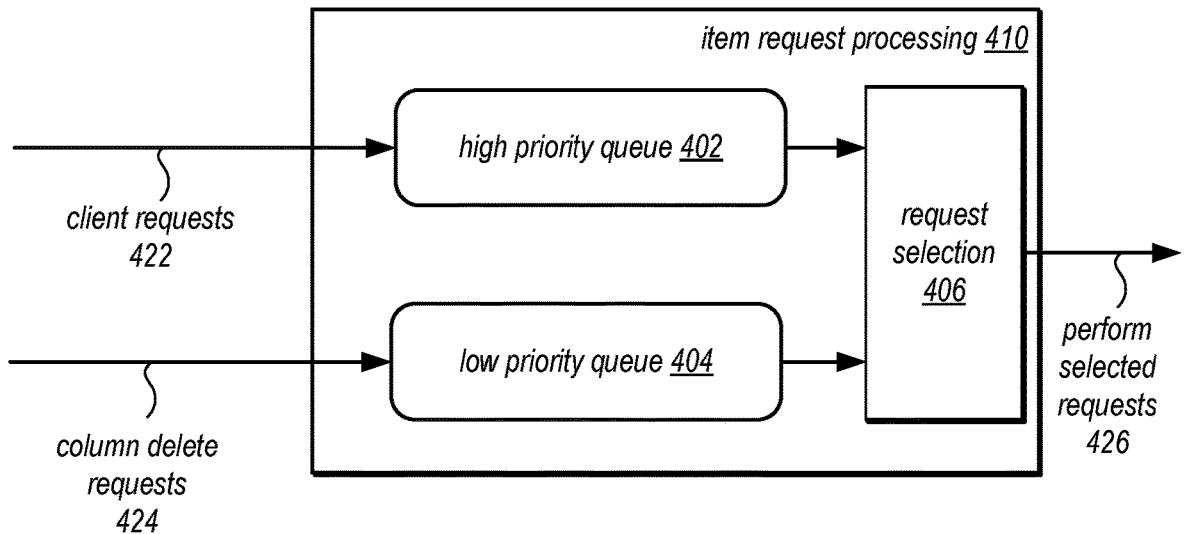
FIGS. 4A and 4B are logical block diagrams illustrating performance of deletion operations for a dropped column, according to some embodiments.
Figure 4B:
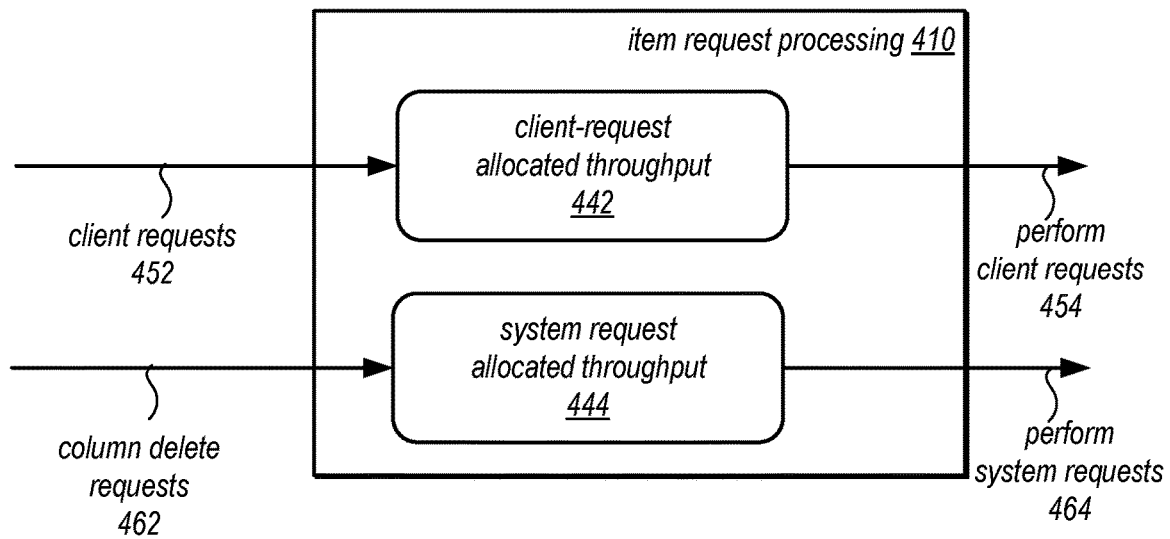

In order to prevent drop column processing from interfering with client application requests, different schemes for ordering and or prioritizing operations may be implemented. FIGS. 4A and 4B are logical block diagrams illustrating performance of deletion operations for a dropped column, according to some embodiments. For example, item request handling 410, which may be similar to item request processing 232 in FIG. 2, may implement different types of queues with different priority. For example, high priority queue 402 may be to accept and perform client requests 422. Low priority queue 404 may be implemented to handle column delete requests, as indicated at 424. Request selection 406 may select according to various weighting schemes or rotations handling operations in the respective queues to perform selected requests 426 (e.g., waiting till high priority queue 402 is empty, or selecting from high-priority queue 9 times out of 10 according to a weighted round-robin scheme, etc.).

In FIG. 4B, item request handling 410 implements different allocations of resources for performing different types of requests. For example, client-request allocated throughput 442 may be implemented to provide a performance 454 of requests from a client, as indicated at 452, with an allocated throughput (e.g., IOPs). Similarly, system request allocate throughput 444, may provide a set of implemented to provide a performance 454 of requests for column deletion, as indicated at 462, with an allocated throughput (e.g., IOPs), which may be different than and/or not interfere with the allocation to client requests 442, in some embodiments.

Figure 5:
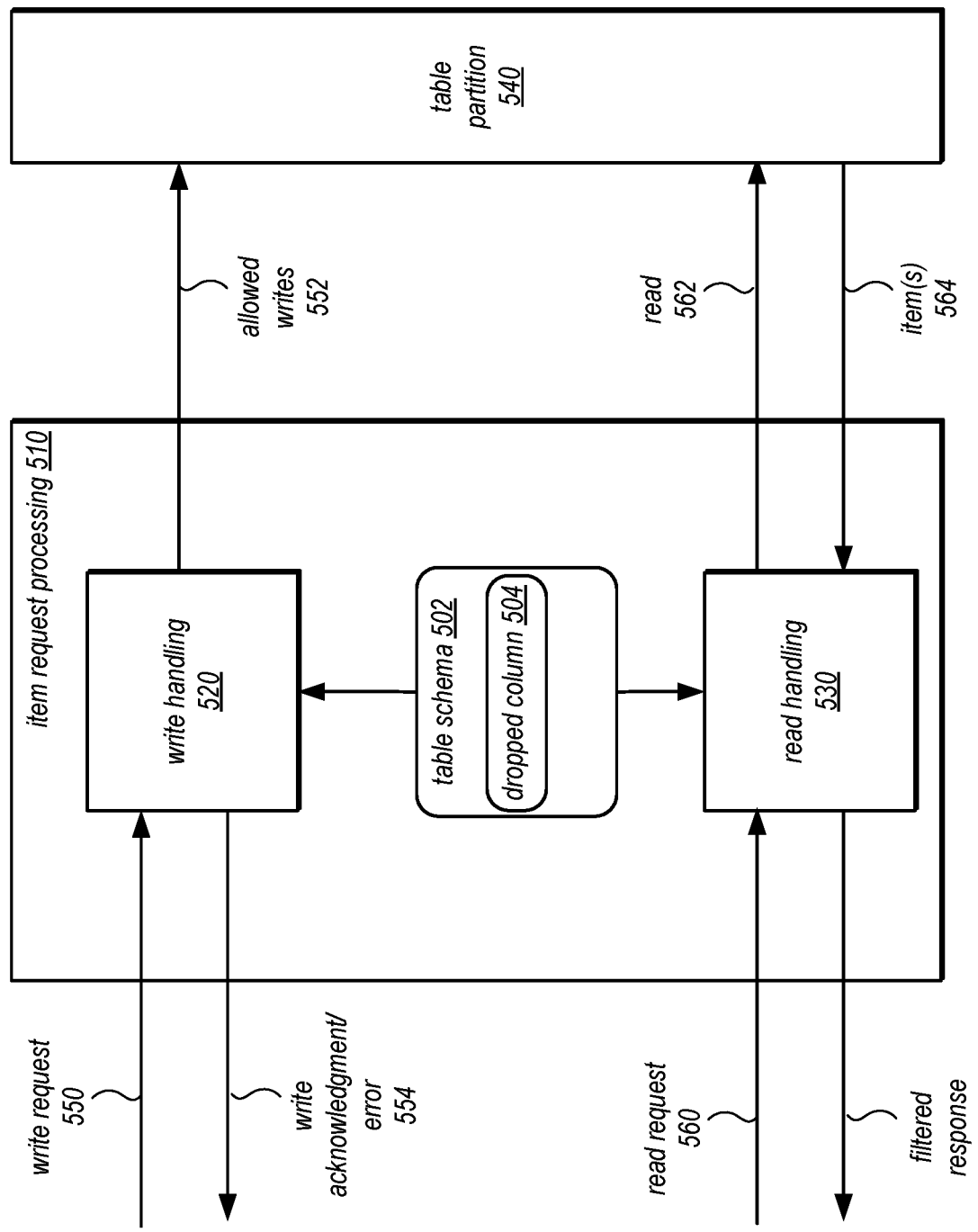
FIG. 5 is a logical block diagram illustrating read and write handling for a non-relational database that implements efficient drop column requests, according to some embodiments.

FIG. 5 is a logical block diagram illustrating read and write handling for a non-relational database that implements efficient drop column requests, according to some embodiments. Item request processing 510, which may be similar to item request processing 410 and 232 in FIG. 2, may implement both write handling 520 and read handling 530 that rely upon a table schema 502 in order to handle different scenarios involving a dropped column. For example, a write request 550 may be received at write handling 520, which may determine from schema 502 whether or not the write is to a dropped column 504 in the item. If the write is to a dropped column and would be denied because of a size limitation, then as discussed in detail below with regard to FIG. 8, the write request 550 may be allowed, as indicated at 552 in order to perform the write at the table partition 540 at the storage node. If the write request 550 is directed to a column of an item that no longer exists because the dropped column 504 indication, then the write may be denied, as indicated 554, by sending an error response. Allowed writes 552 may have write acknowledgements sent.

In another example, read handling 530 may utilize table schema 502 to determine how to handle some read requests, like read request 560. For example, read request 560 may be targeted to an item that includes a dropped column. As the column may or may not have been deleted yet, read handling 530 may read the item, as indicated 562, and receive the item 564 from table partition 540. Read handling 530 may then filter the item and return a filtered response 566 that removes the column attribute value from the response, in some embodiments.

Figure 6:
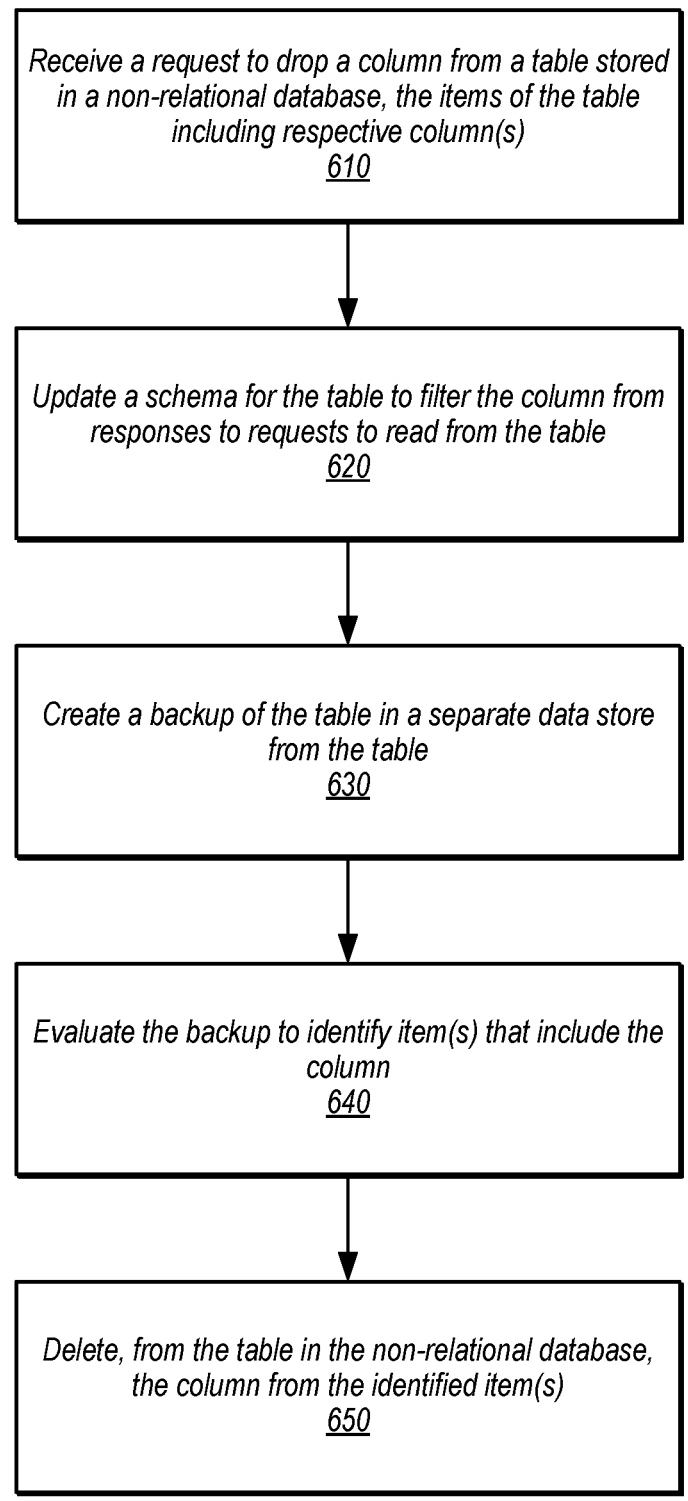
FIG. 6 is a high-level flowchart illustrating various methods and techniques to implement efficient drop column requests in a non-relational database, according to some embodiments.

The examples of a database that implements different types of index structures for storing database data in a replica group as discussed in FIGS. 2-5 above have been given in regard to a non-relational database service (e.g., document database, NoSQL database, etc.). However, various other types of non-relational database systems can advantageously efficient drop column requests, in other embodiments. FIG. 6 is a high-level flowchart illustrating various methods and techniques to implement efficient drop column requests in a non-relational database, according to some embodiments. These techniques, as well as the techniques discussed with regard to FIGS. 7-8, may be implemented using components or systems as described above with regard to FIGS. 2-5, as well as other types of databases or storage systems, and thus the following discussion is not intended to be limiting as to the other types of systems that may implement the described techniques.

As indicated at 610, a request to drop a column from a table stored in a non-relational database may be received, in some embodiments. A non-relational database table may be implemented according to various non-relational schemas or formats that do not, for instance, require each item in a table (e.g., a collection of items) to store the same attributes. For those items that do store the same attributes (e.g., by a same attribute name or key), a request, such as drop column request, may treat the same attributes in the different items as a "column" (e.g., though no such schema may be enforced). In some embodiments, however, a schema may be defined that includes a column. In some embodiments, column values may be null or not stated. The request to drop the column may specify the column according to a name or other identifier that can be mapped to each item to determine if that item stores that column.

As indicated at 620, a schema for the table may be updated to filter the column from responses to requests to read from the table, in some embodiments. For example, table metadata maintained along with the data of the table may describe various aspects of the table, including as data organization or schema, or may indicate that item attributes that can be associated as a column (e.g., with a same attribute name) may be filtered out of requests, as discussed in detail below with regard to FIG. 7.

As indicated at 630, a backup of the table may be created in a separate data store from the table, in some embodiments. For example, as discussed above with regard to FIG. 3, an archive or other copy of the table may be created. The backup may be associated with version or point-in-time of the table that corresponds to when the drop table request is to be applied (e.g., at a timestamp or logical sequence number (LSN) associated with the drop table request), in some embodiments.

As indicated at 640, the backup may be evaluated to identify item(s) that include the column, in some embodiments. For example, the backup may be scanned item by item in order to determine whether a column value is present in an item. In some embodiments, the data may be stored in column-oriented format so that all column values (if existing) are stored together in data blocks, pages, and/or chunks of storage. When an item with an attribute associated with the column to be dropped is identified, it may be added to a list of items to be updated, in some embodiments.

As indicated at 650, the column may be deleted from the identified item(s) in the table, in some embodiments. For example, respective delete operations or requests may be performed to update individual items. In some embodiments, different schemes for scheduling or allocating resources to performance of delete requests in order to limit or prevent impact on client application requests may be performed, such as different priority queues and/or different throughput allocations, as discussed above with regard to FIGS. 4A and 4B.

Figure 7:
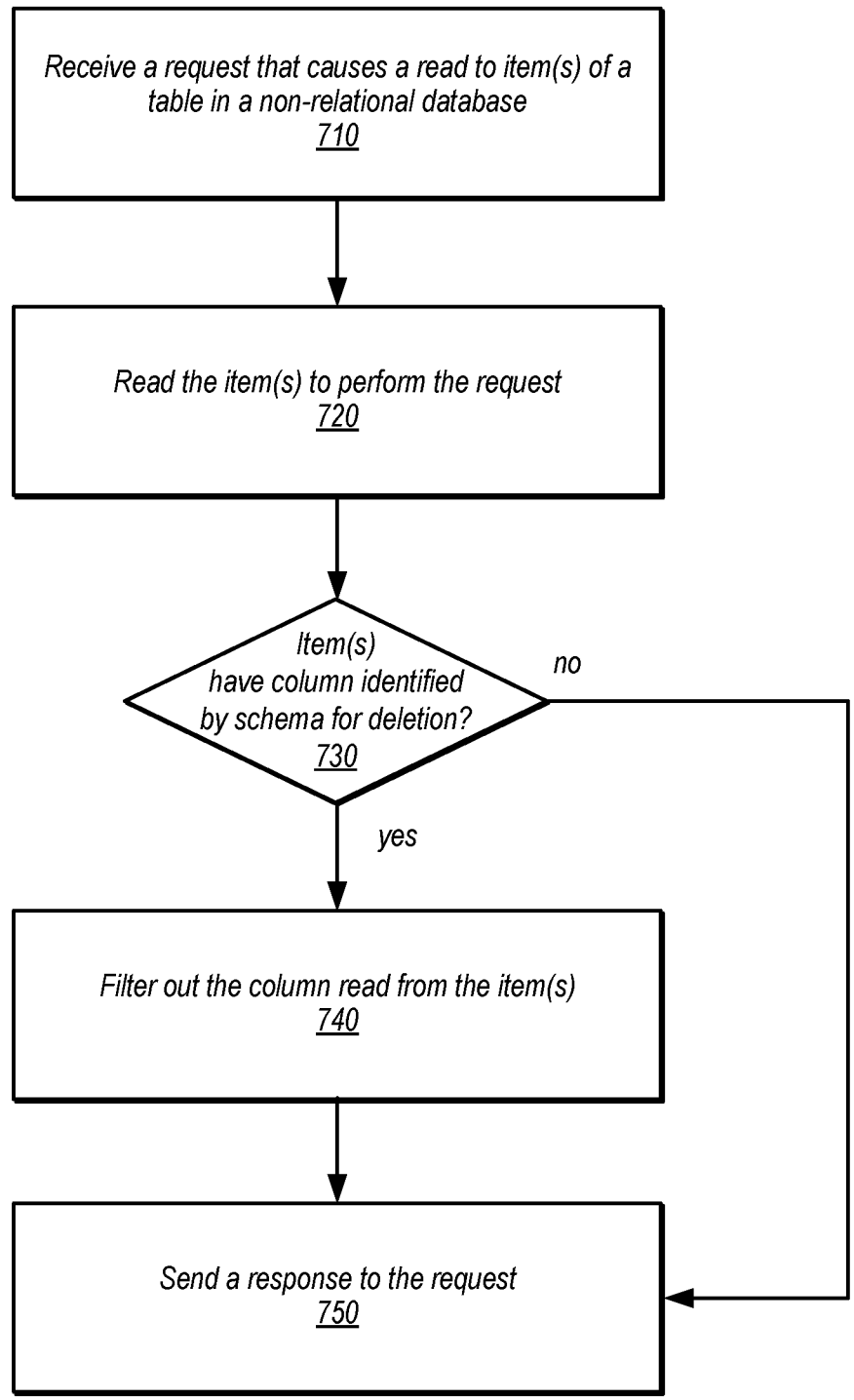
FIG. 7 is a high-level flowchart illustrating various methods and techniques to handle read requests for a non-relational database that implements efficient drop column requests, according to some embodiments.

The non-relational database system may continue to accept requests that cause reads and writes tot the database while a table is being dropped, in some embodiments. FIG. 7 is a high-level flowchart illustrating various methods and techniques to handle read requests for a non-relational database that implements efficient drop column requests, according to some embodiments. Such techniques may be applied during (maybe after) deletion of a column to be dropped, in some embodiments.

As indicated at 710, a request may be received that causes a read to item(s) of a table in a non-relational database, in some embodiments. For example, a query, get, scan, or other type of read causing request may be received. As indicated at 720, the item(s) to perform the request may be read from the table, in some embodiments. As indicated at 730, a determination may be made as to whether the item(s) have a column identified by schema for deletion, in some embodiments. For example, the item attributes returned from the read may be compared with the schema which may indicate an attribute name for a dropped column.

As the state of the table may be in transition, with some items having the column requested, and others not, the data read from the item may be updated in order to present a result consistent with a dropped column. Therefore, as indicated at 740, the column indicated as dropped in items, may be filtered out, in some embodiments. Then, a response to the request may be sent, as indicated at 750. For those read requests that do not touch items with dropped columns, no filtering may need to be applied, as indicated by the negative exit from 730.

Figure 8:
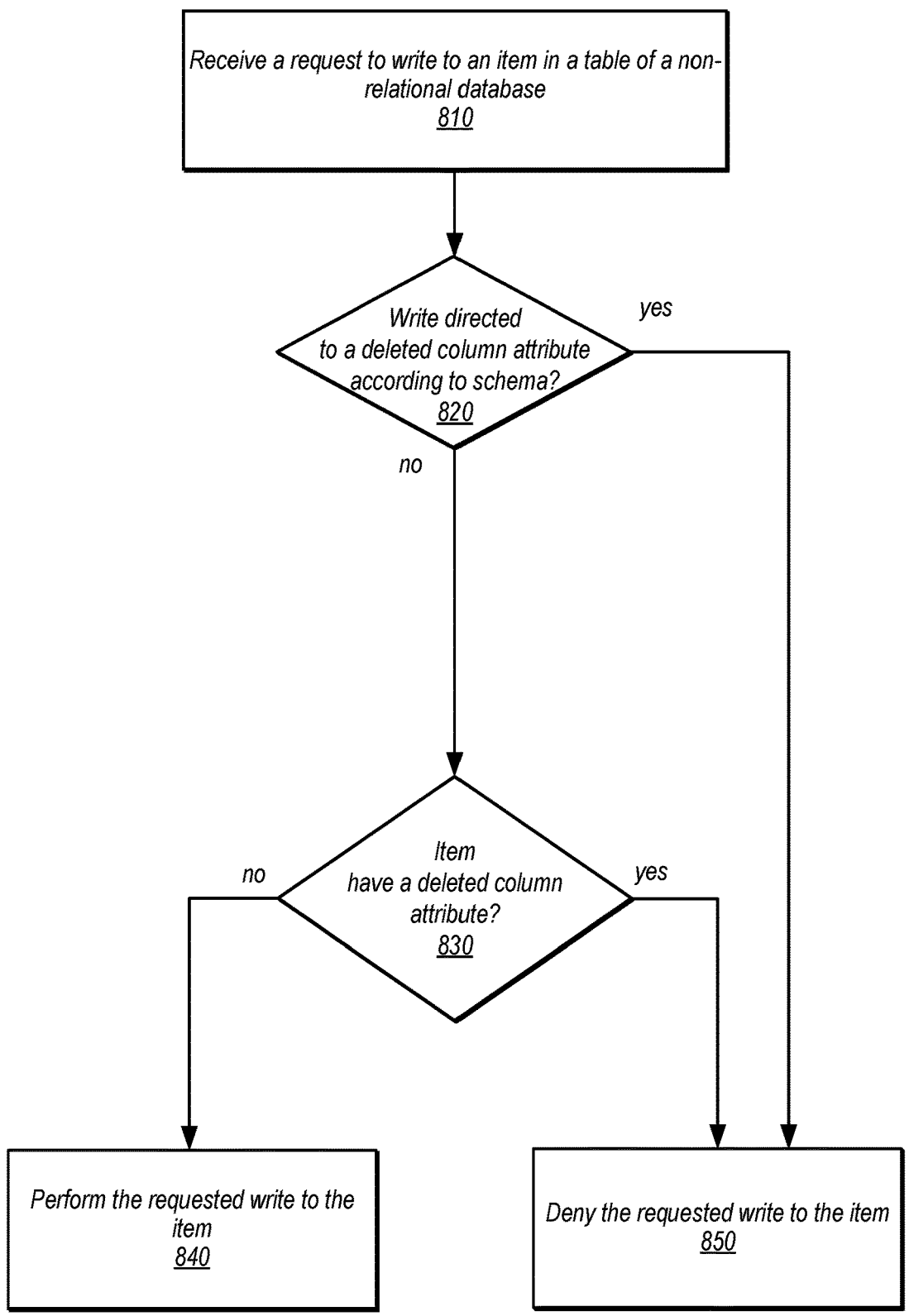
FIG. 8 is a high-level flowchart illustrating various methods and techniques to handle write requests for a non-relational database that implements efficient drop column requests, according to some embodiments.

FIG. 8 is a high-level flowchart illustrating various methods and techniques to handle write requests for a non-relational database that implements efficient drop column requests, according to some embodiments. As indicated at 810, a request to write to an item in a table of a non-relational database may be received, in some embodiments.

A determination may be made as to whether the write is directed to a deleted column attribute, as indicated at 820. If so, then as indicated by the negative exit from 820, then the write to the requested item may be denied. If not, then as indicated at 830, a determination may be made as to whether the item (regardless of the attribute targeted by the write) has a deleted column attribute. If not, then the requested write may be performed, as indicated at 840. If so, then the requested write to the item may be denied, as indicated at 850.

In some embodiments, instead of denying requests to items with a deleted attribute, other techniques may be implemented. For example, the deleted attribute(s) may be removed and the write performed to the item. In some embodiments, size checks may be performed. For example, the total size of the item with the write applied may be used to determine whether or not a size limitation is exceeded, in some embodiments. If the item does have a deleted column attribute, then the size of the dropped column attribute may be subtracted from the total item size, in some embodiments. This modified total item size may then be evaluated with respect to the impact of the write request on the size limitation (e.g., if an item has a size of 4.5 MB and a deleted column attribute of 0.5 MB, then the total size 4.0 MB may be combined with a write of 1.0 MB and compared with the size limitation<=5.0 MB). In the above example, without removing the dropped column attribute value the size would exceed the size limitation (e.g., 5.5 MB is >5.0 MB), but with the modified total size, the total size with the write would be 5.0 MB which satisfies <=5.0 MB size limitation). If the size limitation is not exceeded, then the requested write may be performed. If the size limitation is exceeded, then the requested write to the item may be denied.

As discussed above, other write handling scenarios for dropped columns may occur. For example, a column that is being dropped may be identified in a write request to change a column value. An error may be returned as the column no longer exists.

The methods described herein may in various embodiments be implemented by any combination of hardware and software. For example, in some embodiments, the methods may be implemented by a computer system (e.g., a computer system as in FIG. 9) that includes one or more processors executing program instructions stored on a computer-readable storage medium coupled to the processors. The program instructions may implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 9:
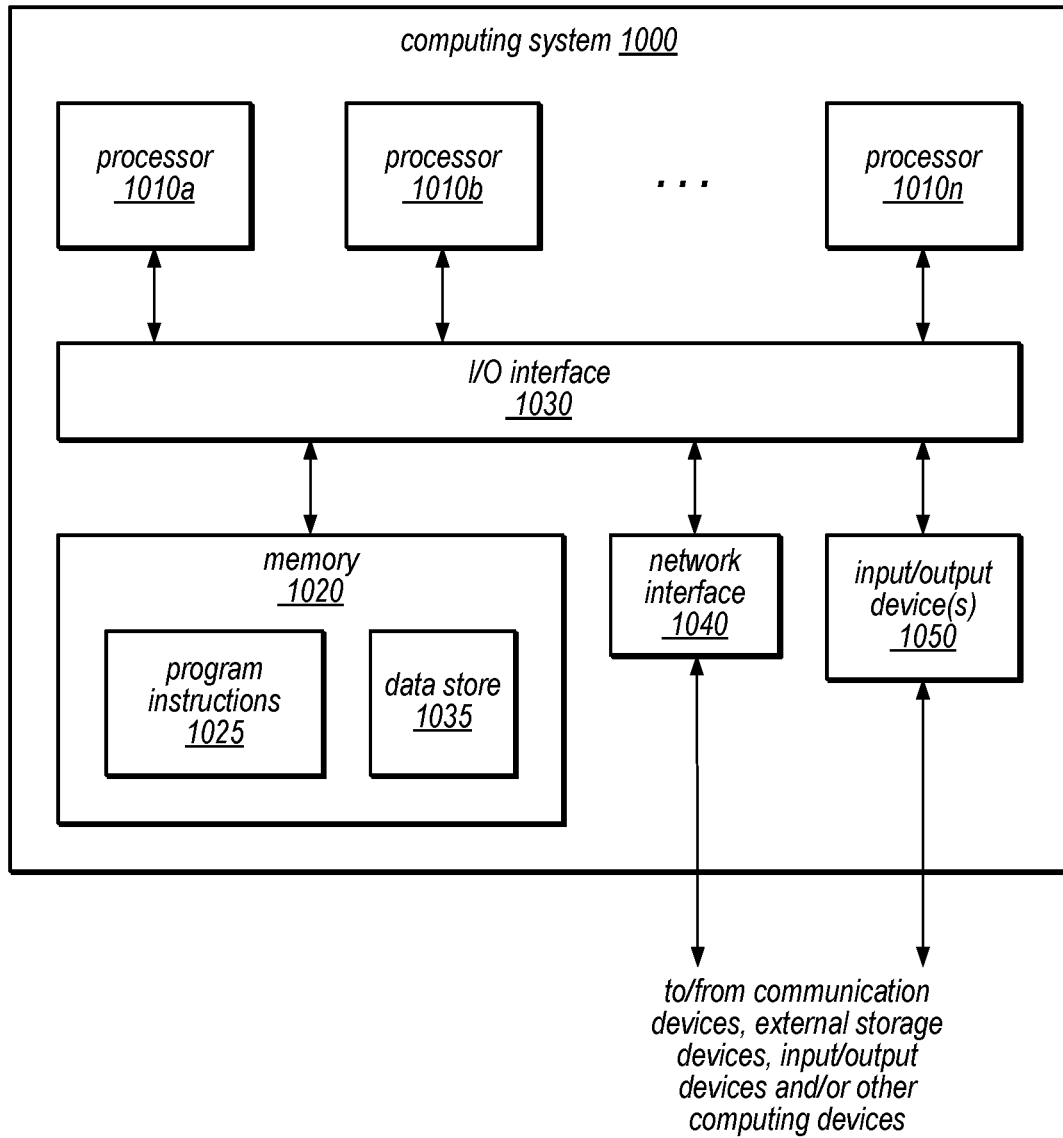
FIG. 9 is a block diagram illustrating an example computing system, according to some embodiments.

Embodiments to implement efficient drop column requests in a non-relational database as described herein may be executed on one or more computer systems, which may interact with various other devices. One such computer system is illustrated by FIG. 9. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or compute node, computing device or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device, keyboard, and display(s). Display(s) may include standard computer monitor(s) and/or other display systems, technologies or devices, in some embodiments. In some embodiments, it is contemplated that embodiments may be implemented using a single instance of computer system 1000, while in other embodiments multiple such systems, or multiple nodes making up computer system 1000, may host different portions or instances of embodiments. For example, in some embodiments some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions, in some embodiments. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device, in some embodiments. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in some embodiments.

System memory 1020 may store program instructions 1025 and/or data accessible by processor 1010 to implement different types of index structures for storing database data in a replica group, in some embodiments. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. A computer-accessible medium may include non-transitory storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040, in some embodiments.

In some embodiments, I/O interface 1030 may be coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000, in some embodiments. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000, in some embodiments. Multiple input/output devices 1050 may be present in computer system 1000 or may be distributed on various nodes of computer system 1000, in some embodiments. In some embodiments, similar input/output devices may be separate from computer system 1000 and may interact with one or more nodes of computer system 1000 through a wired or wireless connection, such as over network interface 1040.

As shown in FIG. 9, memory 1020 may include program instructions 1025, that implement the various embodiments of the systems as described herein, such as techniques to perform efficient drop column operations and request handling, and data store 1035, comprising various data accessible by program instructions 1025, in some embodiments. In some embodiments, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1000 may be transmitted to computer system 1000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
at least one processor; and
a memory, storing program instructions that when executed by the at least one processor, cause the at least one processor to implement a non-relational database system;
wherein the non-relational database system stores a table in a first data store, wherein the table comprises a plurality of items that respectively comprise a plurality of attributes, wherein at least two of the plurality of items in the table respectively include a same named attribute, wherein at least a different one of the plurality of items does not include the same named attribute and wherein the non-relational database system does not enforce a strict schema that requires values for every column in the table; and
wherein the non-relational database system is configured to:
receive a drop column request to remove the same named attribute from the table as if the same named attribute were stored in a column of the table; and
responsive to receipt of the request:
cause, at the first data store for the table, filtering of the same named attribute from responses to client read requests to the table that read from the at least two items;
create a backup of the table in a second data store that is separate from the first data store, the backup comprising respective copies of the plurality of items stored in the table including the at least two items of the plurality of items that include the same named attribute and the different one of the plurality of items that does not include the same named attribute;
send one or more requests to the second data store storing the backup of the table that cause a scan of the respective copies of the plurality of items in the backup to identify the at least two items that include the same named attribute, limiting interference with client requests that access the table; and
send one or more delete requests to the first data store, wherein the one or more delete requests specify the identified at least two items to delete the same named attribute from the at least two identified items in the table.

2. The system of claim 1, wherein to perform the delete requests at the first data store to delete the same named attribute from the identified at least two items, the non-relational database system is configured to utilize system-request allocated throughput that is different from client-request allocated throughput for performing the client requests.

3. The system of claim 1, wherein the non-relational database system is further configured to:
receive a read request to an item of the table;
read the item from the table;
determine that the item has a deleted same named attribute;
filter the same named attribute from the item read from the table; and
return a response to the read request using the filtered item.

4. The system of claim 1, wherein the non-relational database system is a database service implemented as part of a provider network, wherein the table is stored across a plurality of partitions at different respective storage nodes of the database service, and wherein the different respective storage nodes implement the first data store.

5. A method, comprising:
receiving a drop column request to remove a same named attribute from a table stored in a first data store of a non-relational database system as if the same named attribute were stored in a column of the table, wherein the table comprises a plurality of items that respectively comprise a plurality of attributes, wherein at least two of the plurality of items in the table respectively include the same named attribute, wherein at least a different one of the plurality of items does not include the same named attribute, and wherein the non-relational database system does not enforce a strict schema that requires values for every column in the table; and
responsive to receiving the request:
causing, at the first data store for the table, filtering of the same named attribute from responses to client read requests to the table that read from the at least two items;
causing creation of a backup of the table in a second data store that is separate from the first data store, the backup comprising respective copies of the plurality of items including the at least two items of the plurality of items that include the same named attribute and the different one of the plurality of items that does not include the same named attribute;
sending one or more requests to the second data store to evaluate the respective copies of the plurality of items in the backup to identify the at least two items that include the same named attribute column, limiting interference with client requests that access the table; and
sending one or more delete requests to the first data store, wherein the one or more delete requests specify the identified at least two items to delete the same named attribute from the at least two items in the table in the first data store.

6. The method of claim 5, further comprising:
receiving a client read request that causes a read of an item of the table;
reading the item of the table from the table at the first data store;
determining that the item has a same named attributed identified for deletion;
filtering out the same named attribute of the item read from the table; and
sending a response to the client read request that causes the read of the item using the filtered item.

7. The method of claim 5, wherein operations to delete the same named attribute from the identified at least two items are placed in a low priority queue at the first data store, wherein client requests are placed in a high priority queue, and wherein the first data store handles requests according a location of the requests in either the low priority queue or high priority queue.

8. The method of claim 5, wherein the delete requests are performed at the first data store utilizing system-request allocated throughput that is different from client-request allocated throughput for performing the client requests.

9. The method of claim 5, further comprising:
receiving a request to write to an item in the table;
determining that the item includes the same named attribute;
subtracting a size of the same named attribute from a total size of the item;
determining that the write applied to the total item size does not exceed a size limitation for the item; and
performing the request write to the item at the table at the first data store.

10. The method of claim 5, further comprising:
receiving a second drop column request to drop a second same named attribute from the table stored in the non-relational database system; and
responsive to receiving the request to drop the second same named attribute:
  causing the second same named attribute to be filtered from responses to requests to read from the table; and
  performing the sending one more requests to evaluate and the one or more delete requests to delete with respect to the second named attribute.

11. The method of claim 5, further comprising:
receiving a second column drop request to drop another same named attribute in the table in the non-relational database system;
determining that the table is locked for performing another drop column request; and
returning a denial to the second drop column request.

12. The method of claim 5, further comprising:
receiving a request that causes a read of an item of the table;
reading the item of the table from the table at the first data store;
determining that the item has does not have the same named attribute; and
sending a response to the request that causes the read of the item using the item read from the table.

13. The method of claim 5, wherein the table is stored across a plurality of partitions at different respective storage nodes of the non-relational database system, and wherein the different respective storage nodes implement the first data store.

14. One or more non-transitory, computer-readable storage media, storing program instructions that when executed on or across one or more computing devices cause the one or more computing devices to implement:
receiving a drop column request to remove a same named attribute from a table stored in a first data store of a non-relational database system, wherein the table comprises a plurality of items that respectively comprise a plurality of attributes, wherein at least two of the plurality of items in the first copy of the table respectively include the same named attribute, wherein at least a different one of the plurality of items does not include the same named attribute, and wherein the non-relational database system does not enforce a strict schema that requires values for every column in the table; and
responsive to receiving the request:
  causing, at the first data store for the table, filtering of the same named attribute from responses to client read requests to the table that read from the at least two items;
  causing creation of a backup of the table in a second data store that is separate from the first data store, the backup comprising respective copies of the plurality of items stored in the first copy of the table including the at least two items of the plurality of items that include the same named attribute and the different one of the plurality of items that does not include the same named attribute;
  sending one or more requests to the second data store storing the second copy of the table to cause a scan of the respective copies of the plurality of items in the backup to identify the at least two items that include the same named attribute; and
  sending one or more delete requests to the first data store, wherein the one or more delete requests specify the identified at least two items and cause the same named attribute to be deleted from the identified at least two items table.

15. The one or more non-transitory, computer-readable storage media of claim 14, where in operations to delete the identified at least two items are placed in a low priority queue, wherein the client requests are placed in a high priority queue, and wherein the non-relational database system handles requests according a location of the request in either the low priority queue or high priority queue.

16. The one or more non-transitory, computer-readable storage media of claim 14, wherein performance of the one or more delete requests utilize system-request allocated throughput that is different from client-request allocated throughput for performing the client requests.

17. The one or more non-transitory, computer-readable storage media of claim 14, storing further program instructions that when executed cause the one or more computing devices to further implement storing a checkpoint to indicate a progress of deleting the identified at least two items.

18. The one or more non-transitory, computer-readable storage media of claim 14, storing further instructions that when executed on or across the one or more computing devices cause the one or more computing devices to further implement:
receiving a request to write to an item in the table at the first data store; and
responsive to determining that the write to the item writes to a deleted same named attribute, returning an error in response to the request to write to the item.

19. The one or more non-transitory, computer-readable storage media of claim 14, storing further instructions that when executed on or across the one or more computing devices cause the one or more computing devices to further implement:
receiving a request that causes a read of an item of the table at the first data store;
reading the item from the table stored in the first data store;
determining that the item has the same named attribute;
filtering out the same named attribute of the item read from the table; and
sending a response to the request that causes the read of the item using the filtered item.

20. The one or more non-transitory, computer-readable storage media of claim 14, wherein the non-relational database system is a database service implemented as part of a provider network, wherein the table is stored across a plurality of partitions at different respective storage nodes of the database service, and wherein the different respective storage nodes implement the first data store.

* * * * *